(12) United States Patent
Avraham et al.

(10) Patent No.: US 10,456,959 B2
(45) Date of Patent: Oct. 29, 2019

(54) BAMBOO RAILROAD TIE MANUFACTURING SYSTEM

(71) Applicants: Jason Avraham, Pikesville, MD (US);
David Johns, Woodinville, WA (US);
Patrick Wang, Taoyuan (TW);
Jean-Luc Kouyoumji, Bordeaux (FR);
Reuben Smith, Seattle, WA (US)

(72) Inventors: Jason Avraham, Pikesville, MD (US);
David Johns, Woodinville, WA (US);
Patrick Wang, Taoyuan (TW);
Jean-Luc Kouyoumji, Bordeaux (FR);
Reuben Smith, Seattle, WA (US)

(73) Assignee: TieBam, Inc., San Francisco, CA (US)

( * ) Notice: Subject to any disclaimer, the term of this patent is extended or adjusted under 35 U.S.C. 154(b) by 922 days.

(21) Appl. No.: 15/003,698

(22) Filed: Jan. 21, 2016

(65) Prior Publication Data

US 2016/0208441 A1  Jul. 21, 2016

Related U.S. Application Data

(60) Provisional application No. 62/125,362, filed on Jan. 21, 2015.

(51) Int. Cl.
| | | |
|---|---|---|
| *B29C 43/00* | (2006.01) | |
| *E01B 3/10* | (2006.01) | |
| *E01B 3/02* | (2006.01) | |
| *B27J 1/00* | (2006.01) | |
| *B27M 3/00* | (2006.01) | |
| *D21B 1/06* | (2006.01) | |

(52) U.S. Cl.
CPC ............. *B29C 43/003* (2013.01); *B27J 1/003* (2013.01); *B27M 3/0053* (2013.01); *E01B 3/02* (2013.01); *E01B 3/10* (2013.01); *D21B 1/061* (2013.01)

(58) Field of Classification Search
CPC ..... B27J 1/003; B27M 3/0053; B29C 43/003; E01B 3/02; E01B 3/10
See application file for complete search history.

(56) References Cited

U.S. PATENT DOCUMENTS

| | | | | |
|---|---|---|---|---|
| 1,942,251 A | * | 1/1934 | Mains .................. | B30B 15/061 425/339 |
| 5,747,177 A | * | 5/1998 | Torimoto ............... | A63B 49/02 428/537.1 |
| 5,836,086 A | * | 11/1998 | Elder ....................... | F26B 3/04 34/396 |

(Continued)

*Primary Examiner* — Atul P. Khare
(74) *Attorney, Agent, or Firm* — Michael L. Greenberg, Esq.; Greenberg & Lieberman, LLC

(57) ABSTRACT

A system for crafting railroad crossties of compressed bamboo is described. The system employs a hydraulic press configured to effectively compress multiple stalks of bamboo into a strong unified beam within a mold. Bamboo is first mashed, dried, and treated. A resin is employed as a permanent adhesive, binding the stalks together. The bamboo is stacked within a mold and compressed under the pressure exerted by the hydraulic press. An oven is used to heat the compressed bamboo, and then the bamboo is cooled. The compressed bamboo beam may then be trimmed to remove excess bamboo, and is cut into crosstie segments if needed. The resulting crosstie is sturdy, ecologically friendly, and rapidly manufactured.

12 Claims, 3 Drawing Sheets

(56) References Cited

U.S. PATENT DOCUMENTS

| | | | |
|---|---|---|---|
| 7,172,136 B2* | 2/2007 | Leon | B09B 3/00 |
| | | | 238/85 |
| 7,708,214 B2* | 5/2010 | Medoff | B29B 17/0042 |
| | | | 241/28 |
| 8,632,644 B2* | 1/2014 | Djerf | B27J 1/003 |
| | | | 156/60 |
| 2008/0277055 A1* | 11/2008 | Yang | B27N 3/04 |
| | | | 156/272.2 |
| 2009/0130377 A1* | 5/2009 | Samanta | C08J 5/045 |
| | | | 428/113 |
| 2011/0293880 A1* | 12/2011 | Yu | B27N 3/04 |
| | | | 428/106 |
| 2012/0237720 A1* | 9/2012 | Djerf | B27J 1/003 |
| | | | 428/106 |
| 2015/0298429 A1* | 10/2015 | Ricketts | B32B 9/02 |
| | | | 428/106 |

* cited by examiner

BAMBOO RAILROAD TIE MANUFACTURING SYSTEM

CONTINUITY

This application is a non-provisional application of provisional patent application No. 62/125,362, filed on Jan. 21, 2015, and priority is claimed thereto.

FIELD OF THE PRESENT INVENTION

The present invention relates to construction methods, and more specifically relates to a method of constructing construction implements including railroad ties, trailer decks, and I-joists out of pressed bamboo material.

BACKGROUND OF THE PRESENT INVENTION

The use of bamboo crossties offers several advantages over traditional oak or other wood crossties. For example, bamboo can be treated prior to processing, making it resistant from mold or rotting. Therefore, bamboo does not have to be covered or pressure-treated with creosote or coal tar to maintain this resistance. Additionally, employing bamboo is far more "Green" or ecologically friendly than traditional railroad crossties, as bamboo can quickly reach usable maturity in merely four to six years. Therefore, bamboo crossties can be produced more quickly and cheaply than conventional crossties.

Thus, there is a need for a system configured to expeditiously craft railroad crossties of bamboo via pressure. Such a system would preferably employ a hydraulic press and mold system, capable of compressing numerous stalks of bamboo together to form a solid unitary construction element.

SUMMARY OF THE PRESENT INVENTION

The present invention is a system for the rapid and effective manufacturing of railroad crossties from strand woven bamboo. Strand woven bamboo is preferably made via a process including taking kiln-dried Bamboo strips, dipping them in a resin, and then compressing them under extreme pressure in a 3,000 ton hydraulic press. Then, while in the press, the bamboo is locked under pressure in a mold. After a period of time, the bamboo is then removed from the press, and is preferably cooked in an oven for six to eight hours. After the heating process, the bamboo is taken out of the oven, emerging as a bamboo railroad crosstie once removed from the mold. The bamboo railroad crosstie produced in this fashion is extremely resilient and strong, making it suitable for applications in the railroad industry and beyond.

BRIEF DESCRIPTION OF THE DRAWINGS

The present invention will be better understood with reference to the appended drawing sheets, wherein.

DETAILED DESCRIPTION OF THE PREFERRED EMBODIMENT

Figure 1:
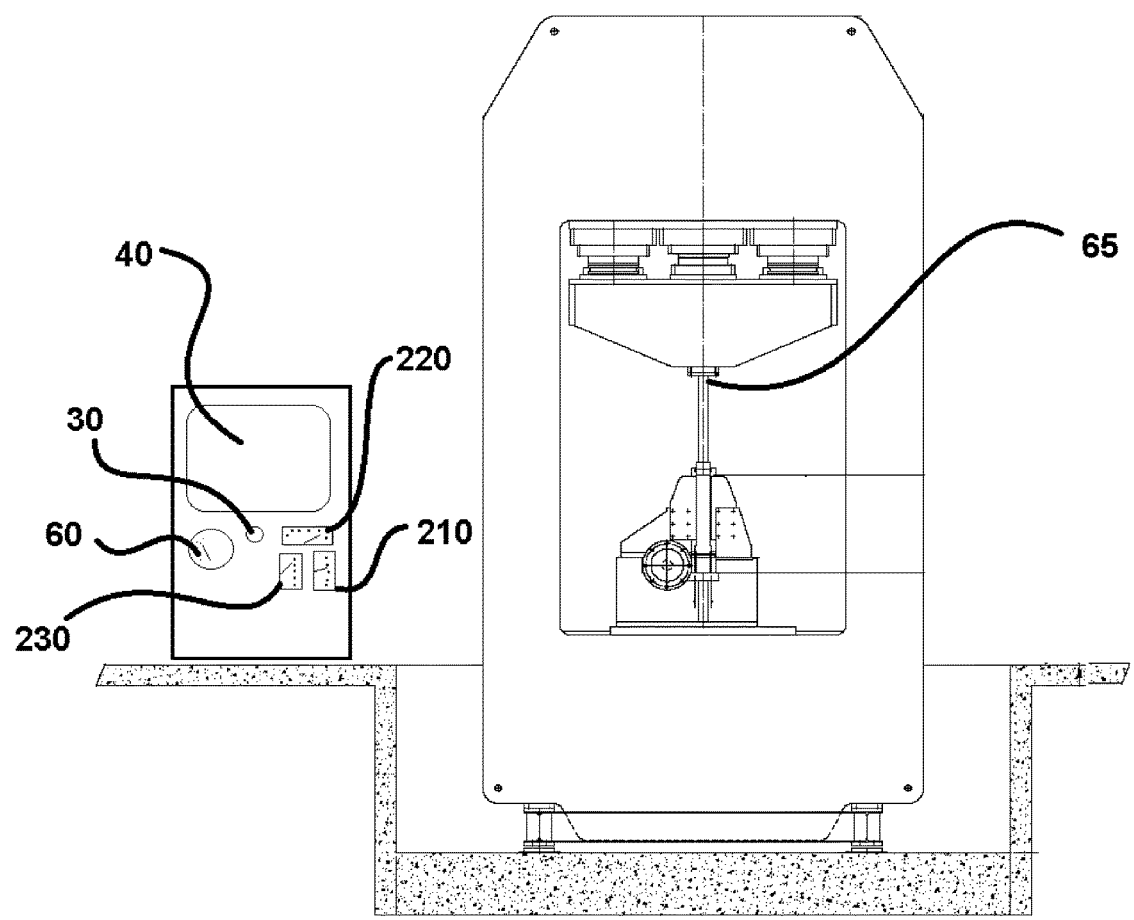
FIG. 1 is a view of the front of the hydraulic press employed by the system of the present invention.

The present invention is a system for producing compressed bamboo crossties and similar compressed bamboo construction products. The system employs a hydraulic press (10) configured to compress multiple bamboo stalks within a mold (20). The hydraulic press (10) is preferably equipped with at least one emergency stop button (30), touch screen display (40), pressure valves, pressure gauges (60), at least one hydraulic pump (70), pipes, at least one slide (65), a cushion system (80), a lubricator, a return oil filtration system, an oil tank, oil level indicator (210), oil temperature sensor (220), and a pressure sensor (230).

Flanges are preferably present at all pipe connection locations. Shock resistant pipe clamps are preferably used, and can effectively control and reduce the vibration of the pipes during use. Pressure gauges (60) are preferably equipped in several critical points of the hydraulic press (10) to facilitate monitoring and easy maintenance. Hydraulic oil temperature is preferably monitored by the oil temperature sensor (220).

Oil temperature is cooled down by (plate type heat exchangers made in USA, assembled in Taiwan) a water cooling heat exchanger. The Manufacturer will provide the requirements of the cooling water, and the preparation of it will be user's own responsibility. The highest temperature of inlet water cannot exceed 25° C. The inlet & outlet water pipes will be arranged by the user. Pressure signal is collected by the pressure sensor and is displayed on the touch screen display (40).

Movement of the slide (65) and its decompression is preferably smooth and stable without high noise, vibration and shock. In the lower cavity of the main cylinder, a supporting system of a safety valve and a counterbalance valve with anti-slide falling circuit is added.

The displacement of stroke of the slide and cushion is digitally controlled by the linear velocity displacement transducers of BALLUFF brand, German made, and displayed on the touch screen display (40). Limit switches are preferably disposed on the top-down-center and bottom-down-center positions of the slide (65) and cushion system (80) for safety protection.

The reliable hydraulic system of the present invention has clear and neat distribution, and is well sealed to prevent oil leakage and oil effusion. Flanges are first adopted for all pipe connections. Additionally, shock resistant pipe clamps and pressure gauges are used to effectively control and reduce the vibration of the pipes. Dust removing and cleaning treatments are preferably given to the interior of all the pipes and oil tanks regularly for maintenance. Oil trays are preferably disposed below the guides to collect lubrication oil for new loop. The lubrication system is interlocked with the machine which cannot be operated once the lubrication system is not running. The oil level of the lubricator is automatically detected as low, an alarm will be displayed and/or sounded on the touch screen display (40).

The standard PLC & touch screen display (40) of the electrical control system of the present invention are from Mitsubishi TM, which actualize all different working action controls of the hydraulic press (10) of the present invention. Through this control system, the operator can preset and adjust the strokes, pressures, etc. of the slide and cushion directly on the touch screen. Values like locations, pressures & speeds of the slide and cushion, machine data, alarms and failure information can be all displayed on the same touch screen display (40).

The hydraulic press (10) is equipped with a movable operation stand (T-stand) with two-hand-button control for ease of operation. An emergency stop button (30) is preferably located on the center of the T-stand. The at least one emergency stop button (30) is preferably disposed on every upright. Two of the uprights are preferably equipped with lamps to illuminate the die area.

The hydraulic press (10) preferably has one set floor mounted type electrical control cabinet equipped with air conditioning as standard feature. The touch screen display (40) is preferably disposed in the upper side of front panel of the electrical control cabinet.

Figure 2:
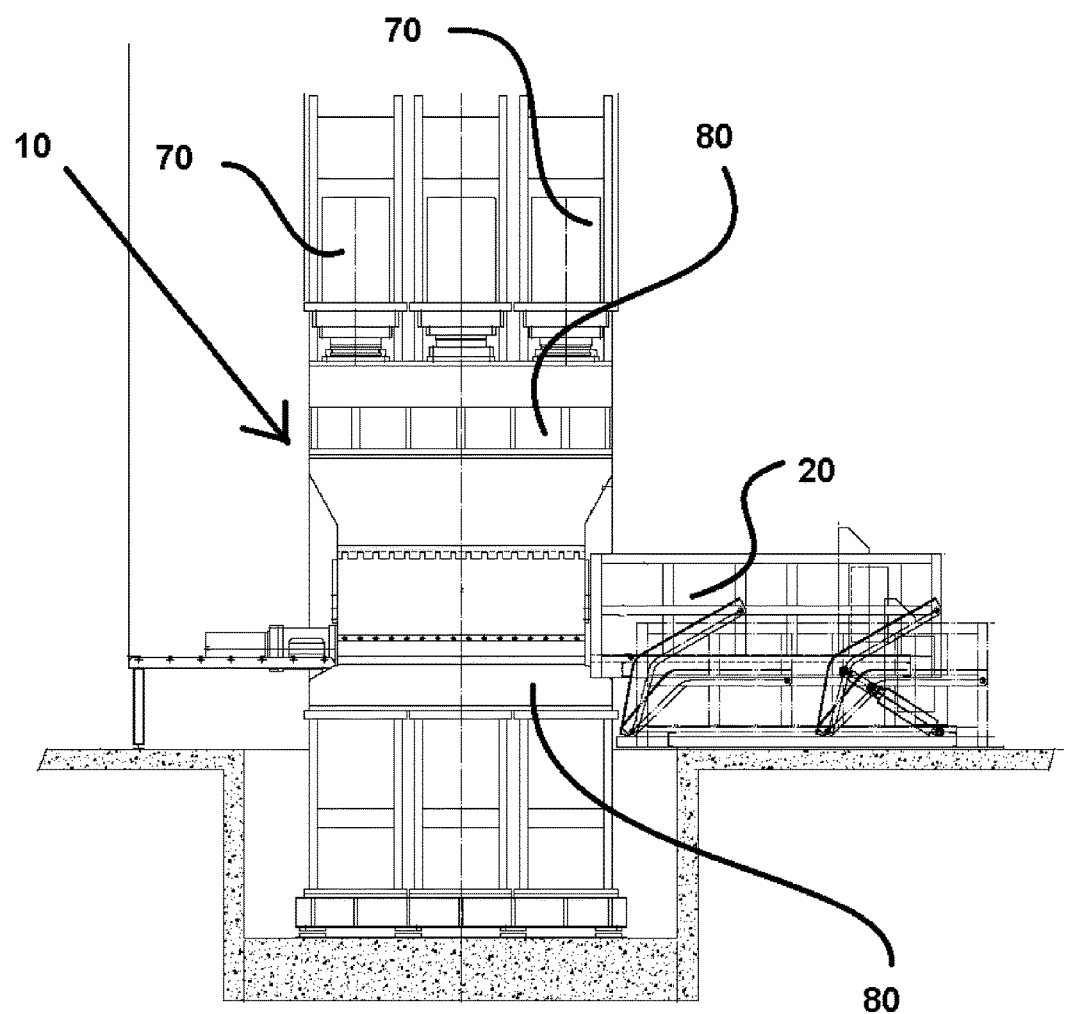
FIG. 2 exhibits a view of the side of the hydraulic press employed by the system of the present invention.
Figure 3:
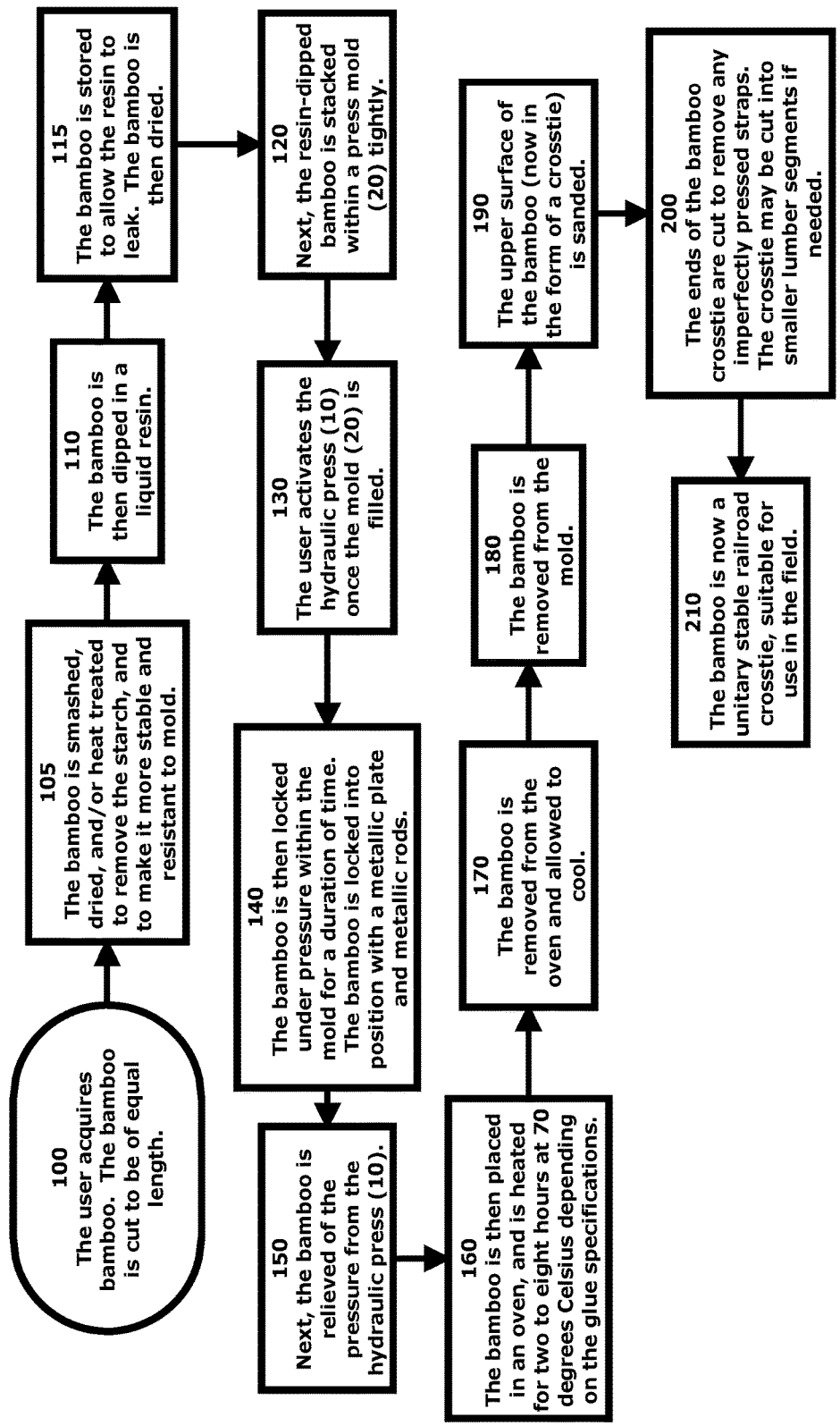
FIG. 3 is flow chart depicting the process of use of the system of the present invention.

The process of use of the present invention, as depicted in FIG. 2, is preferably as follows:

1. The user acquires bamboo. The bamboo is cut to be of equal length. (100)
2. The bamboo is smashed, dried, and/or heat treated to remove the starch, and to make it more stable and resistant to mold. (105)
3. The bamboo is then dipped in a liquid resin. (110)
4. The bamboo is stored to allow the resin to leak. The bamboo is then dried. (115)
5. Next, the resin-dipped bamboo is stacked within a press mold (20) tightly. (120)
6. The user activates the hydraulic press (10) once the mold (20) is filled. (130)
7. The bamboo is then locked under pressure within the mold for a duration of time. The bamboo is locked into position with a metallic plate and metallic rods. (140)
8. Next, the bamboo is relieved of the pressure from the hydraulic press (10). (150)
9. The bamboo is then placed in an oven, and is heated for two to eight hours at 70 degrees Celsius depending on the glue specifications. (160)
10. The bamboo is removed from the oven and allowed to cool. (170)
11. The bamboo is removed from the mold. (180)
12. The upper surface of the bamboo (now in the form of a crosstie) is sanded. (190)
13. The ends of the bamboo crosstie are cut to remove any imperfectly pressed straps. The crosstie may be cut into smaller lumber segments if needed. (200)
14. The bamboo is now a unitary stable railroad crosstie, suitable for use in the field. (210)

Alternate embodiments of the present invention include variations on the pressure employed to fashion the crossties, the manner by which the hydraulic press is used, and any treatment that may be made to the bamboo post-compression. It is envisioned that little, if any additional treatment post-compression is required to ensure a crosstie having a long lifespan of use. It should be understood that the pressed bamboo can be made in a bigger shape by using a larger mold, which enhances the capacity to manufacture multiple crossties per pressing step.

It should be noted that in the preferred embodiment of the present invention, the lubrication system is independent from the hydraulic system of the hydraulic press (10). Three operation modes are preferably available for different working requirements, including: "OFF", "INCH", "SINGLE STROKE (one push for a complete stroke)". The operation mode is directly selected by the user on the touch screen display (40), and the buttons are well distributed on the control panel. When working under "SINGLE" mode, the ejection and drawing functions can be applied depending on actual demand. Two forming modes of "pressure dependent" & "position dependent" are available for "SINGLE" mode operation.

Additionally, indicators of the working status of the touch screen display (40), control buttons and switches are all integrated on the control panel of the independent operation stand of the present invention. Real-time information of action sequences and I/O status is also displayed on the touch screen.

The information below is preferably displayed on the touch screen display (40) of the present invention:
  Language in English
  Display of machine status and stroke
  Failure display, diagnosing function and failure part indication
  Die data storage—up to 100 sets of dies can be stored
  Display and modify the next die data
  Production output counter (displayed directly on the touch screen)
  Annotation and real time display of I/O status
  Other display information requested by the Buyer according to actual production demand.

The process of the present invention in the manufacturing of crossties of bamboo is extended to different sized cross-sections of beams. As such, different trays and molds are used to achieve these various sizes of beams. While it is envisioned that a wide variety of sized beams can be produced via the system of the present invention, the following are specific measurements for three primary sizes:
  Cross sections of 150×150×3000 m for a first size crosstie;
  Cross sections of 305×150×3000 m for a second size crosstie; and
  Cross sections of 305×305×3000 m for a third size crosstie.

Additionally, it should be noted that the system of the present invention is ecologically friendly, and is fashioned to employ energy-saving equipment. Likewise, noise and vibration level of the machine conforms to environmental protection programs. Y-delta start is applied to the machine to reduce inrush current and eliminate voltage dips on overburdened supplies. Similarly, the hydraulic press (10) of the present invention is driven by liquid medium, hydraulic oil, which doesn't contain any toxic substance. Major parts such as top crown, uprights, bolster table, slide and lower base are all jointed by $CO_2$ gas shield welding with good workmanship, box-shape welding structure, stiffeners and symmetric bevel welding. Additionally, the process described herein is energy efficient, keeping energy costs low. Similarly, the bamboo pretreatment process can be accomplished using excess bamboo as a fuel.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

We claim:

1. A method of manufacturing railroad crossties from bamboo, the method comprising:
   cutting bamboo stalks to be of equal length;
   mashing the cut bamboo stalks;
   heat-treating the mashed bamboo stalks to remove starch therefrom;
   dipping the heat-treated bamboo stalks into a resin;
   drying the dipped bamboo stalks in storage;
   stacking the dried bamboo stalks tightly within a press mold of a hydraulic press;
   compressing the stacked bamboo stalks in the press mold via the hydraulic press;
   locking the compressed bamboo stalks under pressure within the hydraulic press so as to form densified compressed bamboo;
   releasing the locking pressure of the hydraulic press;
   heating the densified compressed bamboo in an oven while still within the press mold for at least two hours at 70 degrees Celsius;
   removing the heated and densified compressed bamboo from the oven;
   cooling the heated and densified compressed bamboo; and
   removing the cooled and densified compressed bamboo from the press mold as a bamboo railroad crosstie.

2. The method of claim 1, further comprising:
   sanding an upper surface of the crosstie;
   trimming ends of the crosstie to remove excess bamboo; and
   cutting the crosstie into smaller lumber segments.

3. The method of claim 2, wherein said locking is conducted with a metallic plate and metallic rods.

4. The method of claim 1, wherein said locking is conducted with a metallic plate and metallic rods.

5. The method of claim 4, wherein said locking is performed for at least 5 minutes.

6. The method of claim 1, wherein said heat-treating makes the bamboo more stable and resistant to mold.

7. The method of claim 1, wherein the crosstie has a cross section of 150×150×3000 m, 305×150×3000 m, or 305×305×3000 m.

8. A method of manufacturing railroad crossties from bamboo, the method comprising the following first through thirteenth steps performed in sequence:
   first, cutting bamboo stalks to be of equal length;
   second, mashing the cut bamboo stalks;
   third, heat-treating the mashed bamboo stalks to remove starch therefrom;
   fourth, dipping the heat-treated bamboo stalks into a resin;
   fifth, drying the dipped bamboo stalks in storage;
   sixth, stacking the dried bamboo stalks tightly within a press mold of a hydraulic press;
   seventh, compressing the stacked bamboo stalks in the press mold via the hydraulic press;
   eighth, locking the compressed bamboo stalks under pressure within the hydraulic press via metallic plates and metallic rods for at least 5 minutes so as to form densified compressed bamboo;
   ninth, releasing the locking pressure of the hydraulic press;
   tenth, heating the densified compressed bamboo within the press mold in an oven for at least two hours at 70 degrees Celsius;
   eleventh, removing the heated and densified compressed bamboo from the oven;
   twelfth, cooling the heated and densified compressed bamboo; and
   thirteenth, removing the cooled bamboo from the press mold as a bamboo railroad crosstie.

9. The method of claim 8, further comprising:
   sanding an upper surface of the crosstie;
   trimming ends of the crosstie to remove excess bamboo; and
   cutting the crosstie into smaller lumber segments.

10. The method of claim 8, wherein said locking is performed for at least 5 minutes.

11. The method of claim 8, wherein said heat-treating makes the bamboo more stable and resistant to mold.

12. The method of claim 8, wherein the crosstie has a cross section of 150×150×3000 m, 305×150×3000 m, or 305×305×3000 m.

* * * * *